United States Patent [19]

Matsunaga et al.

[11] 4,187,512
[45] Feb. 5, 1980

[54] INK LIQUID SUPPLY SYSTEM FOR AN INK JET SYSTEM PRINTER

[75] Inventors: Shoichi Matsunaga; Fumio Siozaki, both of Yamatokoriyama; Masahiko Aiba, Nara, all of Japan

[73] Assignee: Sharp Kabushiki Kaisha, Osaka, Japan

[21] Appl. No.: 917,591

[22] Filed: Jun. 21, 1978

[30] Foreign Application Priority Data

Jun. 27, 1977 [JP] Japan .................................. 52-76754

[51] Int. Cl.² ...................... G01D 15/16; G01D 15/18
[52] U.S. Cl. .................................... 346/140 R; 346/75
[58] Field of Search .............................. 346/75, 140 R

[56] References Cited

U.S. PATENT DOCUMENTS

| | | | |
|---|---|---|---|
| 3,761,953 | 9/1973 | Helgeson et al. | 346/140 R X |
| 4,007,684 | 2/1977 | Takano et al. | 346/140 R X |
| 4,024,544 | 5/1977 | Vernon | 346/140 R X |
| 4,042,937 | 8/1977 | Perry et al. | 346/140 R X |
| 4,106,032 | 8/1978 | Miura et al. | 346/140 R |
| 4,112,433 | 9/1978 | Vernon | 346/140 R X |

Primary Examiner—George H. Miller, Jr.
Attorney, Agent, or Firm—Birch, Stewart, Kolasch & Birch

[57] ABSTRACT

An electromagnetic cross valve is provided for selectively connecting a nozzle with an ink liquid supply conduit and an ink liquid drain conduit. When the nozzle is connected with the ink liquid drain conduit, ink liquid is maintained at the atmospheric pressure and remains in the nozzle in such a manner that the ink liquid is filled to the tip end of the nozzle or the orifice of the nozzle. Fluid resistance means are disposed between the electromagnetic cross valve and the ink liquid drain conduit for preventing generation of negative pressure at the nozzle side when the nozzle is connected with the ink liquid drain conduit.

5 Claims, 8 Drawing Figures

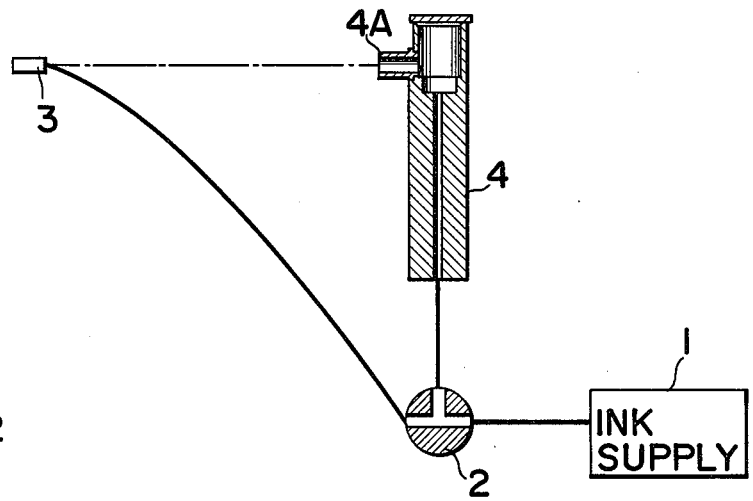
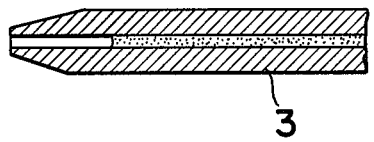
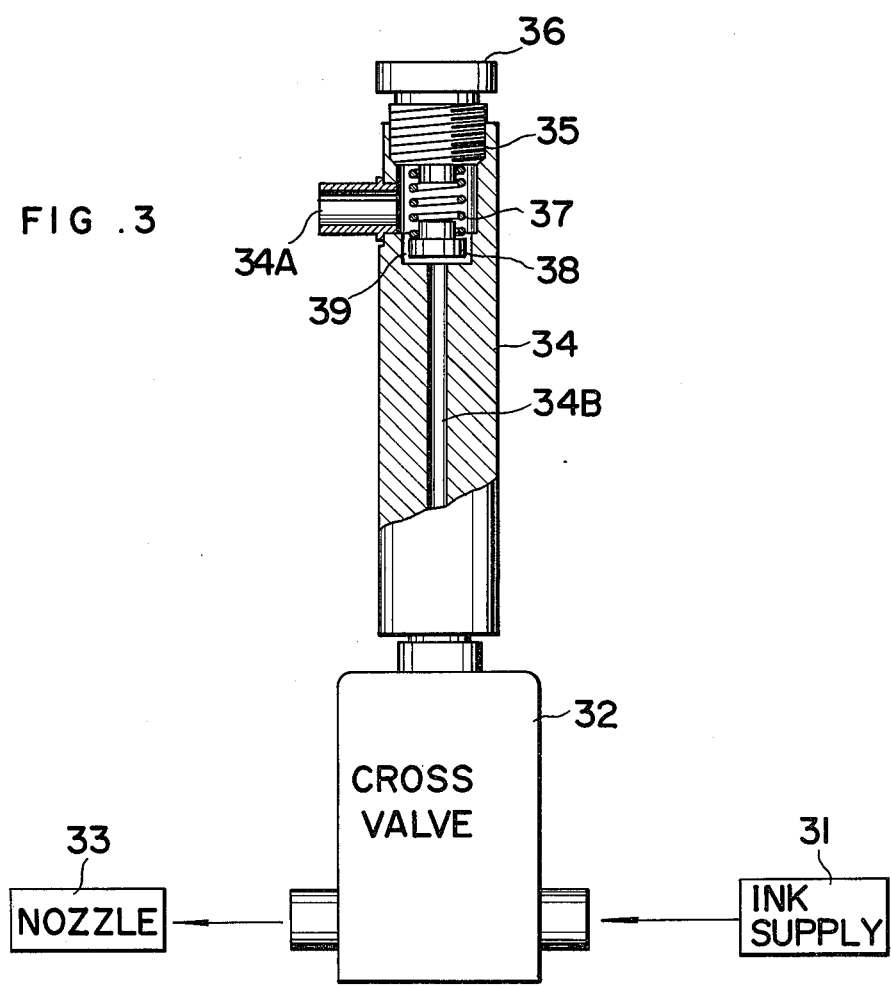

INK LIQUID SUPPLY SYSTEM FOR AN INK JET SYSTEM PRINTER

BACKGROUND AND SUMMARY OF THE INVENTION

The present invention relates to an ink liquid supply system for an ink jet system printer.

Generally, in an ink jet system printer and, more specifically, in an ink jet system printer of the charge amplitude controlling type, the ink liquid is sent from an ink liquid reservoir to a nozzle under a predetermined pressure when print operation is performed. When the ink jet system printer ceases its operation, the ink liquid supply from the ink liquid reservoir to the nozzle is terminated.

In a system wherein the issuance of the ink liquid from the nozzle is gradually reduced when the ink jet system printer ceases its operation, there is a possibility that the ink liquid droops from the tip end of the nozzle. This will cause the system to operate erroneously or break down, since the insulation of the system can not be maintained.

Accordingly, it is required that the issuance of the ink liquid from the nozzle is suddenly terminated when the ink jet system printer ceases its operation. A typical system to perform sudden termination of the ink issuance from the nozzle is disclosed in U.S. Pat. No. 4,007,684 "INK LIQUID WARMER FOR INK JET SYSTEM PRINTER" issued on Feb. 15, 1977, wherein an electromagnetic cross valve is provided for controlling the supply direction of the ink liquid. When the ink jet system printer ceases its operation, negative pressure is created at the nozzle by the electromagnetic cross valve to return the ink liquid from the nozzle.

In the above-mentioned type of ink liquid supply system the ink liquid surface comes into contact with the air at the interior of the nozzle when the ink jet system printer is not performing a printing operation. Therefore, there is a possibility that the ink liquid may solidify within the nozzle. This will block the orifice of the nozzle when the ink jet system printer begins to operate after an interruption of the printing operation for a considerably long period of time.

In addition, the present inventors have discovered that stable ink issuance is rapidly obtained when the ink liquid is filled to the tip end of the nozzle at a time when the printer operation is not performed.

Accordingly, an object of the present invention is to provide an ink liquid supply system for an ink jet system printer.

Another object of the present invention is to provide an ink liquid supply system for an ink jet system printer, wherein ink liquid is filled to the tip end of a nozzle when an ink jet system printer ceases its operation.

Still another object of the present invention is to provide an ink liquid supply system for an ink jet system printer, which ensures rapid termination of ink issuance from a nozzle when the printing operation is terminated and ensures rapid initiation of stable ink issuance from a nozzle when the printing operation is initiated.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electromagnetic cross valve is provided for selectively connecting a nozzle with an ink liquid supply conduit and an ink liquid drain conduit. The electromagnetic cross valve functions to supply ink liquid from an ink liquid reservoir to the nozzle via the ink liquid supply conduit when the ink jet system printer performs a printing operation. When the ink jet system printer ceases its operation, the electromagnetic cross valve functions to connect the nozzle with the ink liquid drain conduit, whereby the issuance of the ink liquid from the nozzle is suddenly terminated.

A pressure control means is disposed within the ink liquid drain system. The pressure control means has an opening for maintaining the internal pressure of the pressure control means at atmospheric pressure. The opening is held at the height identical with that of the tip end of the nozzle, whereby the ink liquid is filled to the tip end of the nozzle when the ink jet system printer ceases its operation. Fluid resistance means are dispoed within the pressure control means for preventing generation of negative pressure at the nozzle side when the nozzle is connected with the pressure control means.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIG. 1 is a schematic view showing a basic construction of an ink liquid supply system for an ink jet system printer of the present invention;

FIG. 2 is a sectional view of a nozzle showing a condition where the printing operation is terminated in an ink jet system printer including the ink liquid supply system of FIG. 1;

FIG. 3 is a partially sectional view of an essential part of an embodiment of an ink liquid supply system of the present invention;

DESCRIPTION OF THE PREFERRED EMBODIMENTS

Figure 4:
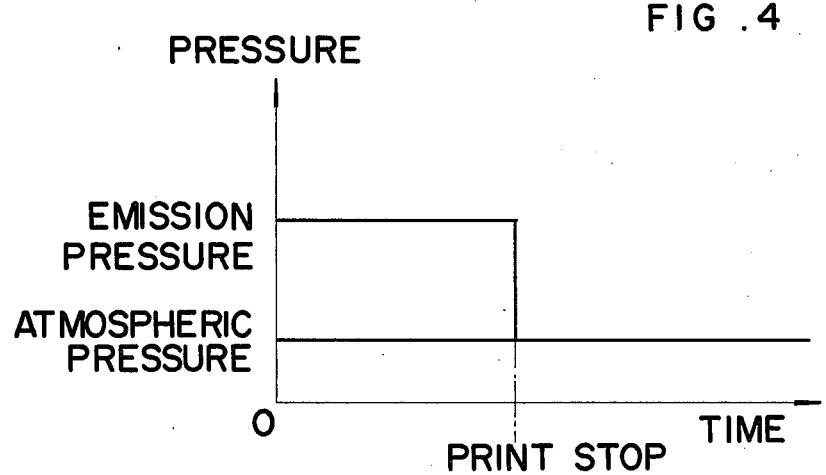
FIGS. 4 through 6 are time charts for explaining operation of the ink liquid supply system of FIG. 3.

FIG. 1 shows a basic construction of an ink liquid supply system for an ink jet system printer of the present invention.

An ink liquid supply source 1 including a pump and an ink liquid reservoir functions to supply ink liquid to a nozzle 3 through an electromagnetic cross valve 2 under a predetermined pressure. The electromagnetic cross valve 2 functions to selectively connect the nozzle 3 to the ink liquid supply source 1 and to an ink liquid drain pipe 4. The ink liquid drain pipe 4 includes an opening 4A maintained at the atmospheric pressure. The opening 4A is held at a height identical with that of the tip end of the nozzle 3.

When a printing operation is performed, the electromagnetic cross valve 2 functions to connect the nozzle 3 with the ink liquid supply source 1. The ink liquid is supplied to the nozzle 3 under a predetermined pressure and emitted from the nozzle 3. When the printing operation is terminated, the electromagnetic cross valve 2 functions to connect the nozzel 3 with the ink liquid drain pipe 4. The emission of the ink liquid from the nozzle 3 is suddenly terminated.

At the moment when the nozzle 3 is connected with the ink liquid drain pipe 4 through the electromagnetic cross valve 2, the ink liquid is conducted to the opening 4A since the ink liquid drain pipe 4 is maintained at the atmospheric pressure. In addition, the ink liquid is held stationary in a condition where the ink liquid is filled to the tip end of the nozzle 3 because the opening 4A is positioned at a height identical with that of the tip end of the nozzle 3.

In the ink liquid supply system of FIG. 1, negative pressure will be generated at the nozzle side at a time when the nozzle 3 is connected with the ink liquid drain pipe 4 through the electromagnetic cross valve 2. Therefore, there is a possibility that the ink liquid is not filled to the tip end of the nozzle 3 as shown in FIG. 2 when the printer operation is not performed.

FIG. 3 shows an embodiment of an ink liquid supply system of the present invention, which can prevent the generation of the negative pressure and can maintain the ink liquid in a condition where the ink liquid is filled to the tip end of the nozzle when the printer operation is terminated.

An ink liquid supply source 31 including a pump and an ink liquid reservoir is connected to an input terminal of an electromagnetic cross valve 32. A nozzle 33 is connected to an output/input terminal of the electromagnetic cross valve 32. A pressure controlling drain pipe 34 is connected to an output terminal of the electromagnetic cross valve 32. The pressure controlling drain pipe 34 has an opening 34A, which is maintained at the atmospheric pressure and held at a height identical with that of the tip end of the nozzle 33 as in the system of FIG. 1.

When a printing operation is performed, the electromagnetic cross valve 32 functions to connect the nozzle 33 with the ink liquid supply source 31, whereby ink liquid is supplied to the nozzle 33 under a predetermined pressure. At this moment, the pressure controlling drain pipe 34 is neither connected with the nozzle 33 nor with the ink liquid supply source 31. When a printing operation is not performed, the electromagnetic cross valve 32 functions to connect the nozzle 33 with the pressure controlling drain pipe 34. At this moment, the ink liquid supply source 31 is neither connected with the nozzle 33 nor with the pressure controlling drain pipe 34.

The pressure controlling drain pipe 34 comprises a cap 36 which has a screwed portion 35 associated with the top end of the pressure controlling drain pipe 34. A valve member 38 is secured to the bottom surface of the cap 36 via a spring 37. The valve member 38 is disposed in a valve chamber 39 communicated with an ink conduit 34B formed in the pressure controlling drain pipe 34. The spring 37 depresses the valve member 38 downward at a given force to close the opening of the ink conduit 34B.

The depression force of the valve member 38 is adjusted through the use of the screwed cap 36 so that the depression pressure of the valve member 38 is less than the ink liquid pressure applied from the nozzle 33 and negative pressure will not be generated at the nozzle side.

When the printer operation is terminated, the nozzle 33 is connected with the pressure controlling drain pipe 34 through the electromagnetic cross valve 32. The ink liquid of a high pressure contained in a conduit between the nozzle 33 and the electromagnetic cross valve 32 is introduced into the ink conduit 34B formed in the pressure controlling drain pipe 34. The valve member 38 is shifted upward by the ink liquid pressure introduced into the ink conduit 34B. That is, the ink liquid is issued from the opening 34A, whereby the ink liquid pressure is suddenly reduced to the atmospheric pressure.

As discussed above, the spring 37 and the valve member 38 function, in combination, to prevent the generation of the negative pressure at the nozzle side.

FIG. 4 shows an optimum pressure variation, where the ink liquid pressure is suddenly reduced to the atmospheric pressure without generation of a negative pressure. The spring 37 must be adjusted to ensure the pressure variation as shown in FIG. 4.

Figure 5:
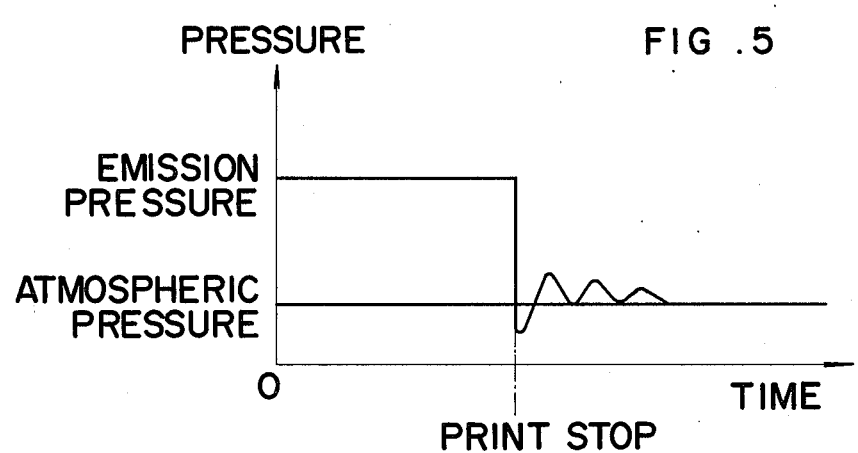
Figure 6:
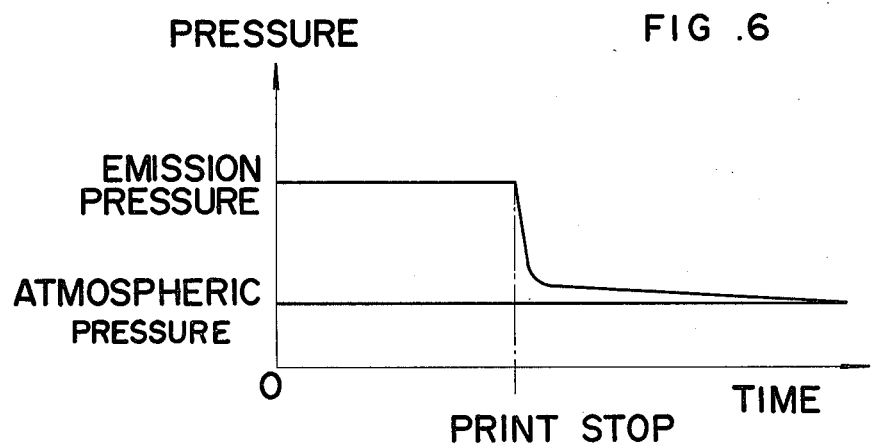

When the spring force is less than the optimum value, the negative pressure will be generated as shown in FIG. 5. Correspondingly, when the spring force is greater than the optimum value, the ink liquid pressure can not be suddenly reduced to the atmospheric pressure as shown in FIG. 6.

The valve member 38 closed the opening of the ink conduit 34B when the ink liquid becomes a stable condition. Therefore, the replacement of the nozzle 33 or the ink liquid supply source 31 will be easily conducted under the situation where the printer operation is not performed.

Figure 7:
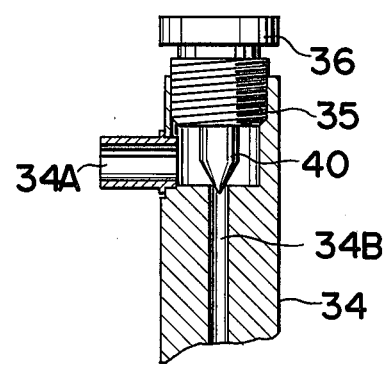
FIG. 7 is a sectional view of an essential part of another embodiment of an ink liquid supply system of the present invention.
Figure 8:
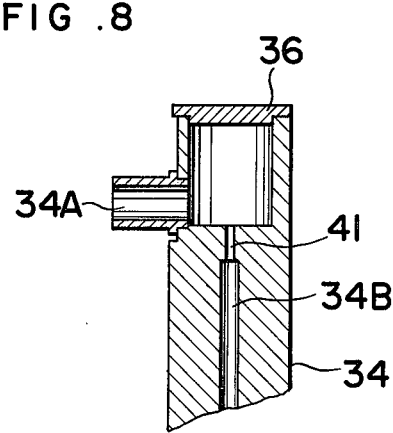
FIG. 8 is a sectional view of an essential part of still another embodiment of an ink liquid supply system of the present invention.

FIGS. 7 and 8 show other embodiments of the pressure controlling drain pipe of the present invention. Like elements corresponding to those of FIG. 3 are indicated by like numerals.

In the embodiment of FIG. 7, a needle valve 40 is employed for providing a predetermined gap space between the tip end of the needle valve 40 and the opening of the ink conduit 34B. In the embodiment of FIG. 8, a choke portion 41 is formed at the opening of the ink conduit 34B.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink liquid supply system for an ink jet system printer comprising an ink liquid supply source for supplying ink liquid to a nozzle under a predetermined pressure, an ink liquid drain system for returning the ink liquid from said nozzle, and a valve means for selectively connecting said nozzle with said ink liquid supply source and with said ink liquid drain system, said ink liquid drain system comprising:
   a pressure controlling drain pipe connected to said selection valve means; and an outlet formed in the pressure controlling drain pipe for maintaining the internal pressure of said pressure controlling drain pipe at the atmospheric pressure, said outlet being located at a height substantially identical with that of the tip end of said nozzle.

2. The ink liquid supply system for an ink jet system printer of claim 1, wherein said ink liquid drain system further comprises a fluid resistance means for preventing generation of a negative pressure at the nozzle when said nozzle is connected with said ink liquid drain system through said selection valve means.

3. The ink liquid supply system for an ink jet system printer of claim 2, wherein said fluid resistance means comprises:
a valve member disposed in said pressure controlling drain pipe; and spring means for adjusting resistance pressure of said valve member.

4. The ink liquid supply system for an ink jet system printer of claim 3, wherein said resistance pressure is less than said predetermined pressure under which the ink liquid is supplied from the ink liquid supply source to said nozzle.

5. The ink liquid supply system for an ink jet system printer of claim 1, 2, 3 or 4, wherein said selection valve means comprises an electromagnetic cross valve having three openings connected to said ink liquid supply source, said nozzle, and said ink liquid drain system, respectively.

* * * * *